Aug. 1, 1939.   A. B. BENNES   2,167,924
TURNING DEVICE
Filed Aug. 20, 1937   2 Sheets-Sheet 1
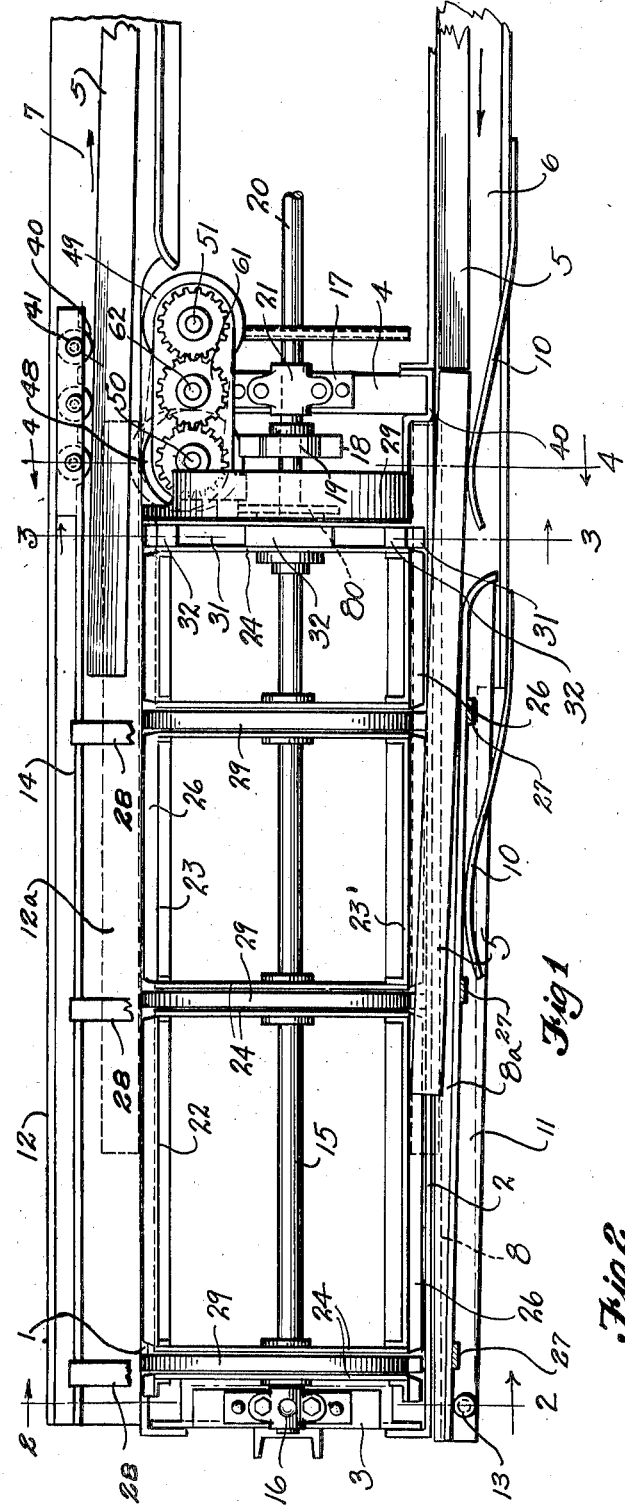
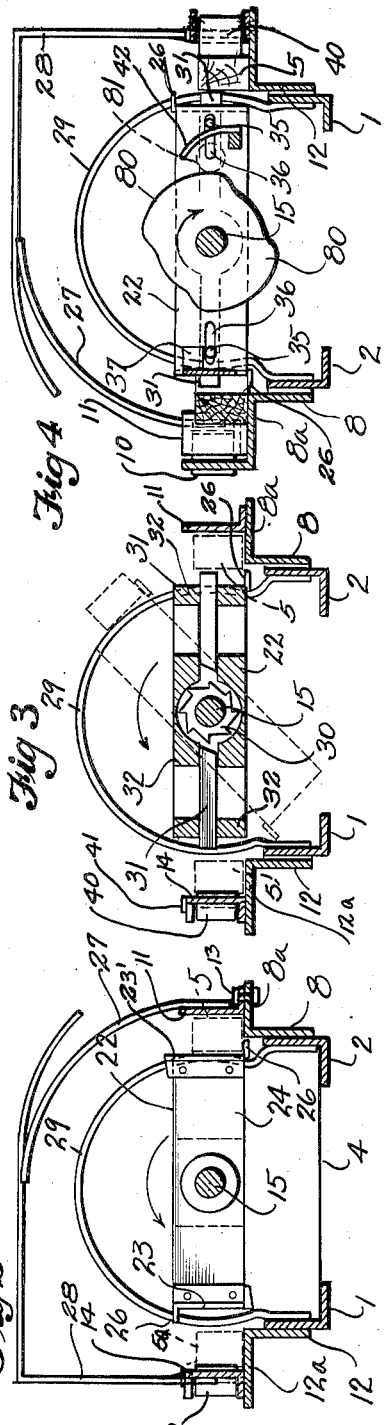
INVENTOR
ADOLPH. B. BENNES
BY
Cook & Robinson
ATTORNEY

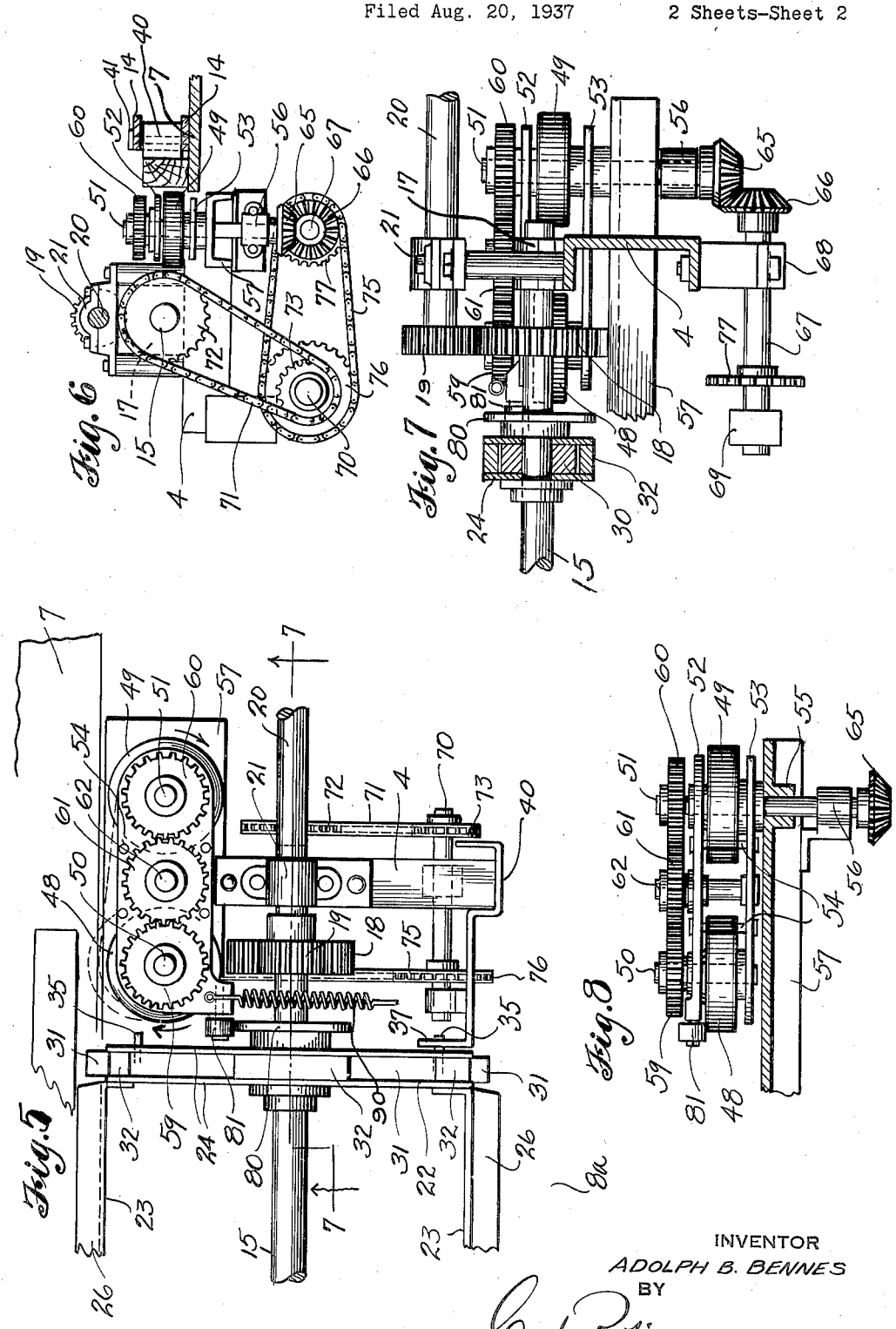

Patented Aug. 1, 1939

2,167,924

UNITED STATES PATENT OFFICE 2,167,924

TURNING DEVICE

Adolph B. Bennes, Tacoma, Wash., assignor, by direct and mesne assignments, of forty per cent to Harmon Manufacturing Company, Inc., Tacoma, Wash., a corporation of Washington, and sixty per cent to F. S. Harmon Manufacturing Company, Tacoma, Wash.

Application August 20, 1937, Serial No. 160,116

8 Claims. (Cl. 144—242)

This invention relates to a turning device especially designed for use in combination with wood working machines such as joiners, matchers, tongue and groove planers, and the like, which are of a type that require that the board pieces, or wooden rails, after being passed through the machine in one direction, for planing or grooving along one edge, shall be turned over and returned through the machine for planing or grooving its opposite edge.

Explanatory to the present invention, it will here be stated that in many factories such as those making furniture, there are machines of the above stated kind used for edging or matching rails, boards, and the like, but in many of such machines, to my knowledge, it is required that an operator be stationed to receive the rails as delivered after the first operation thereon, and to turn them over and again place them in position for return through the machine in the opposite direction for another operation thereon. This use of an attendant is an expense that, in most instances, can be avoided, and it is in order to overcome the need for this operator and also to increase the efficiency and speed of the machine that the present device has been designed.

More specifically stated, it is an object of this invention to provide a mechanical means, which for convenience may be termed a board turning device, and which is suitable for use with various kinds of machines to turn a board, rail or other piece of material as it is delivered thereto from the planing or grooving machine, so as to reverse its position with reference to opposite edges and to position the piece for return through the machine in the opposite direction.

Other objects of the invention reside in the details of construction and combination of parts whereby the turning action is automatically effected upon reception of the board and the latter is automatically fed back into the machine from which it is received after being turned.

Still further objects of the invention reside in the details of construction, in the combination of parts, and in the mode of operation of the machine, as will hereinafter be fully described.

In accomplishing these and other objects of the invention I have provided the improved details of construction, the preferred forms of which are illustrated in the accompanying drawings, wherein—

Fig. 1 is a plan, or top view of a turning device embodying the present invention.

Figs. 2, 3 and 4, respectively, are cross sectional views taken on the lines 2—2, 3—3 and 4—4 in Fig. 1.

Fig. 5 is an enlarged plan view of the driving mechanism, and illustrating the cam which actuates the return feed rollers into contact with the turned piece.

Fig. 6 is an end elevation of the machine, particularly illustrating the various driving connections.

Fig. 7 is an enlarged, sectional detail of the driving gearing as seen substantially on the plane of line 7—7 in Fig. 5.

Fig. 8 is a detail, in side view, of the return feed rollers and their driving gears.

Referring more in detail to the drawings—

The present turning device or mechanism comprises a rectangular main frame structure made up of parallel opposite side beams 1 and 2, of angle iron, joined and secured rigidly in spaced relation by cross members 3 and 4 adjacent opposite ends of the frame. This frame is designed to be supported horizontally by any suitable means whereby it is retained in position to receive the rails or boards as delivered thereto from the planer, edger or other machine with which it is used, and to have the rails or boards returned therefrom to the planer, edger or other machine. The machine which operates on the pieces and with which the present machine is associated, is not here shown, but the pieces, rails or boards delivered therefrom are designated by reference character 5. Reference numerals 6 and 7, respectively, as seen in Fig. 1, indicate guideways along which the pieces 5, or boards, are delivered to and from the present turning device. In the following description, for purpose of easier explanation, the machine which operates on the pieces and which is used in combination with the present device, will be referred to as the edger.

It will be noted by reference to Figs. 1, 2, 3 and 4 that the pieces 5 are advanced to the present device from the edger upon the horizontal flange 8a of an angle iron bar 8 that is attached to the outside of beam 2, and as these pieces 5 are moved into place for being turned over, they are acted against by a leaf spring 10 and an angle beam 11, which is pivotally mounted as at 13, which is also acted against by another leaf spring 10 forming a guideway, and are urged thereby inwardly for a purpose presently apparent. Likewise, when the board pieces 5 are being returned from the turning device to the edger, they are supported by and guided upon the horizontal flanges 12a of an angle iron bar 12 that is attached to the frame rail 1. The parts 8 and 12 are best illustrated in Figs. 2, 3 and 4.

The present turning device also includes a main shaft 15 which extends horizontally and centrally of the main frame and is revolubly supported at its ends in bearings 16 and 17, which, respectively, are fixed upon the cross members 3 and 4 of the main frame. This shaft 15 is continuously rotated during use of the machine by means of a gear wheel 18 that is fixed thereto close to the supporting bearing 17, and in mesh with a driving gear 19 fixed on a driven shaft 20. The shaft 20 is revolubly contained in a bearing 21 that is supported from the cross member 4 of the main frame above bearing 17, and this shaft may be a shaft extended from and driven by the edger driving mechanism. Rotatably mounted on the shaft 15 within the main frame structure, is the rotary turning frame, designated in its entirety by numeral 22. This comprises a rectangular structure having opposite side or longitudinal members 23—23' joined in parallel spaced relation by a plurality of cross members 24. This frame structure is rotatably mounted by the shaft 15 to rotate thereon within the main frame structure as will be understood by reference to its dotted line showing in Fig. 3. However, this frame is normally stationary and held in a horizontal position, but when set in motion, it travels through an arc of 180 degrees and is then stopped.

Along opposite sides of the turning frame, the longitudinal members 23—23' have outturned base flanges 26, and these are so located thereon that when the members 23—23' are disposed at the receiving side of the main frame, the flanges will lie in the same horizontal plane as the flange 8a of the rail 8 on which the pieces 5 are received for turning. Thus, when a board is delivered from the edger along guideway 6 and onto beam 8, it is urged inwardly by the springs 10 and the beam 11 against the vertical side of the turning frame as will be understood by reference to Fig. 2, and there held in position to be picked up by the flange 26 when the frame is rotated, and to be carried thereby to the opposite side of the machine and delivered onto bar 12 into a guideway formed by a fixedly mounted angle iron beam 14 for return to the edger.

Fixed to the main frame at spaced intervals along its length, and disposed transversely of the frame, are bows 29 formed circularly about an axial line that is parallel with the axis of shaft 15 but slightly offset therefrom toward the delivery side of the turning device. These bows are all of the same radius and they serve as guides upon which the board pieces 5 will ride when the turning frame is actuated in a turning operation. The eccentricity of the bows relative to the shaft 15 will cause them to displace the board pieces off of the flange 26 to the position indicated at 5a in Fig. 2 and to deliver them, from the guideway formed by the beam 11, onto the flange 12a of the rail 12 in the guideway formed by the beam 14.

Fixed to the beam 11 and formed to the same radius as the bows 29 are the bows 27 which extend to the center of the machine, as seen in Fig. 2. These bows 27 and 29 act as a guideway for the rails as they are being turned over and hold the rail definitely in place. Likewise, the bows or guides 28, fixed to the beam 14 and extending upwardly and then over the top of the machine somewhat past the center thereof, act to receive the rails as they are being turned over, should the motion be violent or jerky enough to throw them out of place, and to guide them properly into the guideway formed by the beam 14 for return to the edger.

The means for rotatably actuating the frame 22 comprises a ratchet gear 30 that is fixed on the shaft 15, as shown best in Figs. 3 and 7, and two sliding pawls 31—31 which are mounted in alignment and perpendicular to shaft 15 in guide blocks 32 fixed between cross members 24 of the frame 20. These pawls are of such length that, when disengaged from the ratchet, their outer ends extend slightly beyond the sides of the frame, as noted by reference to Fig. 3. Each pawl has a stud 35 fixed therein and extended outwardly through a slot 36 in the cross members, as noted in Figs. 4 and 5, and these studs are adapted to engage with a fixed stop 37 to stop the rotary action of the frame 22 as will presently be explained.

The automatic turning operation of frame 22 is effected as follows: When the board pieces 5 are advanced from the edger along guide 6 to the guide bar 8, they are urged inwardly toward frame 22 by the springs 10, as will be understood by reference to Fig. 1. The outer end of each piece slides in contact with the side wall of the turning frame and the inner end is held out from the frame by an outset shoulder 40 formed as a part of the main frame. As soon as the inner end of the piece 5 that is being advanced passes the outset shoulder, the piece is pushed inwardly by springs 10 and engages against the outer end of the pawl 31 at that side, thereby pushing the pawl inwardly so as to disengage the stop stud 35 from the stop 37 and at the same time engage the inner end of the pawl with the ratchet 30. The ratchet is fixed to the driven shaft 15 and therefore a connection is formed whereby the frame 22 is rotated with the shaft. As the frame rotates, the stud 35 of the engaged pawl is brought into contact with the surface of a cam 42 fixed on the main frame and this cam operates, as will be understood by reference to Fig. 4, to pull the pawl out and free from the ratchet. As the frame 22 thus again comes into a horizontal position after one-half turn with the shaft 15, it delivers the piece 5 onto the guideway 12a and the stud 35 of the other pawl is brought up against the stop 37 and stops the frame in position to receive another piece 5.

After a piece of material has thus been turned, the next operation is to return it to the joiner. This is accomplished by the action of a pair of driven feed rolls and through stationary rollers. The stationary rollers 40 are held in place by pins 41 in the channel part of the beam 14, as seen in Figs. 1 and 4, and the rails are brought to bear against these rollers by the feed rollers, and in this way the friction is greatly reduced. The feed rolls and their driving means are shown best in Figs. 5 to 8. As will be seen in Figs. 5 and 8, two rubber rollers 48 and 49 are mounted on shafts 50 and 51 between spaced plates 52 and 53. These plates are joined rigidly together by bolts 54, thus forming a framework which is adapted to swing in a horizontal plane about the shaft 51, which, as seen in Fig. 8, is mounted in bearings 55 and 56 of a supporting beam 57.

At their upper ends, the shafts 50 and 51, respectively, are equipped with gears 59 and 60, and these operate in mesh with an idler 61 on a stud 62 so that the feed rollers will rotate in the same direction. Shaft 51 is driven by a bevel gear 65 on its lower end which meshes with a driving gear 66 on a horizontal driven shaft 67 supported by bearings 68 and 69 in the main frame. A counter shaft 70 is mounted in the main frame and is driven by a sprocket chain belt 71 that passes about sprocket wheels 72 and 73 fixed in shafts 15 and 70, respectively. Also, shaft 67 is driven by a sprocket chain belt 75 that passes about sprocket wheels 76 and 77 on the shafts 70 and 67, respectively. This driving connection causes a continuous driving of the rubber feed rollers 48 and 49 in the direction indicated by the arrows adjacent thereto in Fig. 5.

When a rail or wooden piece 5 is turned over by the action of frame 22, one end thereof is disposed between the rollers 40 and roller 48 as noted in Figs. 1, 5 and 6. Then the swinging end of the roller mounting frame is actuated outwardly to cause the roller 48 to frictionally engage with the piece and thereby to move it back into the edger along guideway 7. The outward moving action of the swinging frame is effected by a cam 80 fixed on the shaft 15, coaxial thereof, as seen in Figs. 4 and 5, which engages a cam roller 81 on the swinging frame, as seen in Fig. 5. The cam is so shaped that, as a piece of material is delivered onto bar 12, the roller 48 is moved out against it. Then, as the piece 5 is fed by the roller 48 into the edger, the cam allows a spring 90 to pull the roller frame back to normal position and place the rubber feed roller in the clear of the next piece 5 to be advanced; the spring as seen in Fig. 5 being attached at opposite ends to the main frame and to the swinging frame.

Assuming the machine to be so constructed and associated with a machine of the type stated, it is quite readily apparent that pieces delivered from the edger will be mechanically turned over and returned to the edger automatically. Thus the necessity of having an attendant for this operation is eliminated and the speed, efficiency and accuracy of operation of the edger may be greatly increased.

Having thus described my invention, what I claim as new therein and desire to secure by Letters Patent is—

1. A machine of the character described, comprising parallel rail receiving and delivery guideways, a rail turning frame mounted to rotate on an axis parallel with and between the said guideways, means normally holding the turning frame against rotation and means operable automatically upon delivery of a rail into the receiving guideway to cause a rotative action of the turning frame and rail contact means on said frame whereby the said rail will be moved from the receiving guideway along said rail guide devices for delivery thereby in an inverted position into the delivery guideway; said guide devices being circularly curved about an axis that is slightly eccentric of the axis of the turning frame and off-set toward the receiving side of the receiving guideway to cause the rail, in turning, to be displaced in the clear of the contact device of the turning frame.

2. A machine of the character described comprising a main stationary frame having a rail receiving guideway and a rail delivery guideway in spaced relation, a rotatably driven shaft supported between the guideways and extending in a direction lengthwise thereof, a rail turning frame rotatable on the said driven shaft, releasable stops for normally holding the turning frame against rotation, a clutch gear fixed on the shaft, clutch bars slidable in the turning frame and normally disengaged from the gear and extended from the frame into the receiving guideway for actuation by an entering rail into engagement with the clutch gear for actuation of the turning frame, contact devices on the rail frame for engaging the actuating rail to lift it from the receiving guideway and for delivering it in an inverted position into the delivery guideway and arcuate guideways for the travel of the rail therein during its inversion and whereby it is displaced outwardly from the rail contact means upon entering the delivery guideway.

3. A device as recited in claim 2, including a pivoted frame, driven friction rolls mounted by the pivoted frame and means on the turning frame for moving the pivoted frame from an inactive position to a position whereby the friction rolls will engage and effect the movement of the inverted rails from the delivery guideway.

4. A device as in claim 2 including a pivotally mounted frame, driven friction rolls mounted in the frame, a cam on the turning frame adapted to actuate the pivoted frame in a manner to cause the friction rolls to be moved into the delivery guideway as a means of effecting the movement of inverted rails therefrom.

5. A device of the character described, comprising a main frame having parallel, spaced receiving and delivery guideways, a driven shaft medially of the guideways, a rail turning frame located between the guideways and rotatable on the driven shaft, a clutch gear fixed on the shaft, clutch bars slidable in the turning frame, each with a stud thereon, a stop adapted to be engaged by the studs normally to locate the frame in receiving position and to hold it against rotation; said bars having ends extended from the frame to positions that entrance of a rail into the receiving guideway will move the bar that is engaged to disengage its stud from the stop and to engage the clutch gear, thereby to effect a rotative action of the turning frame for the carrying of the said rail from the receiving guideway and its delivery into the delivery guideway in an inverted position.

6. A device as in claim 5, wherein flanges are fixed to the opposite longitudinal edges of the turning frame to engage with and lift the entering rails from the receiving guideway to deliver them to the delivery guideway in an inverted position, and wherein arcuate guides are supported transversely of the turning frame between the guideways and upon which the rails are slid by the turning frame from the receiving to the delivery guideway.

7. A device as in claim 5, wherein flanges are fixed to the opposite side edges of the turning frame to engage with and lift rails from the receiving guideway to deliver them to the delivery guideway, and wherein arcuate guides are supported transversely between the guideways and upon which the rails are moved by the turning frame; said arcuate guides being eccentric of the driven shaft thereby to cause the rails to be displaced outwardly in the clear of the carrying flange as they are brought to the delivery guideway.

8. A machine of the character described, comprising a main frame having a rail receiving guideway and a rail delivery guideway in spaced relation, a rotatably driven shaft supported between the guideways, a rail turning frame rotatable on the said driven shaft, a clutch gear fixed on the shaft, clutch bars slidable in the turning frame at opposite sides of the gear; each with a stud thereon, a stop adapted to be engaged by the studs normally to locate the frame in receiving position and to hold it against rotation; said bars having ends extended from the frame to positions that entrance of a rail into the receiving guideway will move the bar that is engaged to disengage its stud from the stop and to engage the clutch gear, thereby to effect a rotative action of the turmning frame, flanges fixed to the opposite side edges of the turning frame to engage with and lift rails from the receiving guideway to deliver them to the delivery guideway arcuate guides supported transversely between the guideways and upon which the rails will be moved by the turning frame; said arcuate guides being eccentric of the driven shaft, thereby to cause the rails to be displaced in the clear of the carrying flange as they are brought to the delivery guideway, a pivotally mounted frame, driven friction rolls mounted in the said frame, and a cam on the turning frame adapted to actuate the pivoted frame in a manner to cause the friction rolls to be moved into the delivery guideway for effecting the movement of the inverted rails therefrom.

ADOLPH B. BENNES.